United States Patent [19]

Roebke et al.

[11] 4,088,593

[45] May 9, 1978

[54] ION-EXCHANGING ALUMINUM SILICATE WITH HYDROPHILIC SURFACES

[75] Inventors: Wolfgang Roebke, Altenstadt; Dieter Kneitel; Erfried Parr, both of Rodenbach, all of Germany

[73] Assignees: Henkel Kommanditgesellschaft auf Aktien (Henkel KGaA); Deutsche Gold- und Silber-Scheideanstalt vormals Roessler, both of Germany

[21] Appl. No.: 782,749

[22] Filed: Mar. 30, 1977

Related U.S. Application Data

[62] Division of Ser. No. 664,174, Mar. 5, 1976, Pat. No. 4,040,972.

[30] Foreign Application Priority Data

| Mar. 12, 1975 | Germany | 2510675 |
| Mar. 12, 1975 | Germany | 2510741 |
| Mar. 12, 1975 | Germany | 2510742 |
| Mar. 12, 1975 | Germany | 2510676 |

[51] Int. Cl.$^2$ .................. C01B 33/28; C02B 1/16; C02B 1/44; C11D 7/29

[52] U.S. Cl. ................ 252/89 R; 252/131; 252/135; 252/140; 252/145; 252/179

[58] Field of Search ............. 210/38 A, 41; 252/89, 252/131, 135, 140, 145, 179, 455 Z; 423/329

[56] References Cited

U.S. PATENT DOCUMENTS

| 3,692,684 | 9/1972 | Hentschel | 252/89 |
| 3,962,132 | 6/1976 | Haschke | 252/179 X |

FOREIGN PATENT DOCUMENTS

| 813,581 | 10/1974 | Belgium | 252/131 |
| 2,422,655 | 11/1974 | Germany | 252/131 |

Primary Examiner—Dennis L. Albrecht
Attorney, Agent, or Firm—Cushman, Darby & Cushman

[57] ABSTRACT

There are provided alkali aluminum silicates having a hydrophilic surface. They are prepared by mixing a crystalline, ion-exchanging alkali aluminum silicate with a hydrophilic material, preferably ortho-phosphoric acid or an alkali ortho phosphate.

10 Claims, No Drawings

ION-EXCHANGING ALUMINUM SILICATE WITH HYDROPHILIC SURFACES

This is a division, of application Ser. No. 664,174 filed Mar. 5, 1976, now U.S. Pat. No. 4,040,972.

The invention concerns modified, ion-exchanging alkali aluminum silicates, their production and their use in washing, rinsing and cleansing agents. As the alkali in our earlier application Ser. No. 617,394 filed Sept. 29, 1975, there is proposed the inclusion of cation exchanging sodium aluminum silicates in washing, rinsing and cleansing agents.

The use of cation exchanging aluminum silicates, however, is objectionable in a relatively large part of washing, rinsing or cleansing mixtures because this type of agent remains unwet for a relatively long time after sprinkling or jetting into water and in a given case clumps together or floats on the surface of the water.

Through this "sawdust effect" there occurs a delayed effectiveness of this type of washing and cleansing agent, i.e., particularly in use in automatic washing machines, the agent is no longer available to be used up in the complete time in the washing program. However, above all through the "sawdust effect" there can be generally be lost for the washing process a certain portion of this type of washing, rinsing or cleansing agent based on ion-exchanging aluminum silicates, while it is deposited on the boundary surfaces of the washing-liquor-air-container. In order to be able to better utilize the known ability of ion exchanging aluminum silicates to bind $Ca^{++}$ and $Mg^{++}$ ions to build up low phosphate washing, rinsing and cleansing agents, it is necessary to therefore hydrophilize their surfaces in order to improve their wettability by water.

The object of the invention is to prepare an ion-exchanging alkali aluminum silicate characterized by a hydrophilic surface, a process for its production, as well as the use of the ion-exchanging alkali aluminum silicates with hydrophilic surfaces as the framework material in washing, rinsing and cleaning agents.

As alkali aluminum silicates there can be employed sodium aluminum silicate, potassium aluminum silicate, lithium aluminum silicate or mixed alkali aluminum silicates, e.g., sodium-potassium aluminum silicate.

According to the invention, the ion-exchanging alkali aluminum silicate with a hydrophilic surface can be produced by mixing a crystalline ion-exchanging alkali aluminum silicate with a hydrophilic substance, drying and subsequently grinding.

Thus, one process for production of an ion-exchanging alkali aluminum silicate with hydrophilic surfaces comprises intimately mixing crystalline, ion-exchanging alkali aluminum silicate with ortho phosphoric acid and/or an alkali ortho phosphate in an amount up to 30 weight % of the silicate, drying and grinding. As little as 0.5 weight % of ortho phosphoric acid or alkali ortho phosphate can be used.

As ortho phosphoric acid, there is meant an inorganic acid of the formula $H_3PO_4$ whose alkali salts, alkali ortho phosphates, include lithium, sodium and/or potassium salts which correspond to the formulae $MeH_2PO_4$, $Me_2HPO_4$ and/or $Me_3PO_4$ wherein Me is an alkali metal having a valence of 1.

Preferably, the ortho phosphoric acid and/or the alkali ortho phosphate can be dissolved in water and then mixed with the alkali aluminum silicate.

A further process according to the invention for the production of an ion-exchanging alkali aluminum silicate with hydrophilic surfaces comprises intimately mixing the crystalline, ion-exchanging alkali aluminum silicate with up to 30 weight % of penta sodium triphosphate, drying and grinding. As little as 0.5 weight % of penta sodium triphosphate can be used.

Preferably, the penta sodium triphosphate can be dissolved in water and mixed with the alkali aluminum silicate.

A further process according to the invention for the production of an ion-exchanging alkali aluminum silicate with hydrophilic surfaces comprises intimately mixing the crystalline, ion-exchanging alkali aluminum silicate with up to 30 weight % of tartaric acid and/or its alkali salts, drying and grinding. As little as 0.5 weight % of tartaric acid or its alkali metal salt can be used.

Preferably, the tartaric acid and/or it alkali salt, wherein preferably there is meant the lithium, sodium and/or potassium salt can be dissolved in water and then mixed with the alkali aluminum silicate.

Furthermore, an ion-exchanging alkali aluminum silicate with hydrophilic surfaces can be produced by intimately mixing the crstalline, ion-exchanging alkali aluminum silicate with up to 30 weight % of pentaerythritol, drying and grinding. As little as 0.5 weight % of pentaerythritol can be used.

In a preferred form of this process, the pentaerythritol can be dissolved in water and then mixed with the alkali aluminum silicate.

As starting materials for the production of alkali aluminum silicates with hydrophilic surfaces, there can be used zeolitic molecular sieves of types A, X and/or Y. Such materials are disclosed, for example, in Breck, "Zeolite Molecular Sieves", John Wiley & Sons, New York, New York, (1974), the entire disclosure of which is hereby incorporated by reference and relied upon.

A molecular sieve of type A has the summation formula $1.0\pm0.2M_{2/n}O:Al_2O_3:1.85\pm0.5SiO_2:YH_2O$ wherein M is a metal cation, n is its valence and Y has a value up to 6.

The composition of molecular sieves of type X correspond to the formula $0.9\pm0.2M_{2/n}O:Al_2O_3:2.5\pm0.5SiO_2:O$ to 8 $H_2O$ wherein M is a metal cation and n is its valence.

A zeolitic aluminum silicate of type Y has a composition of the formula $0.9\pm0.2M_{2/n}O:Al_2O_3:XSiO_2:YH_2O$ wherein X has a value greater than 3 and Y has any value up to 9.

In all of these types of molecular sieves, there can be preferably used from the group of alkali metals, the metals lithium, sodium and/or potassium.

In washing, rinsing and cleansing agents, the modified alkali aluminum silicates of the invention can be used as framework material, e.g., for removal of ions disturbing the washing process, for example, $Ca^{++}$ and/or $Mg^{++}$ ions.

In admixture with polyphosphates, there can be complexed or exchanged, for example, iron ions or heavy metal ions. This ability is valuable for the washing itself and for avoiding incrustations of the washes and the machine.

There does not occur the injury of hardness sensitive, wash active substances through the formation of hardness, an injury which with soap can lead to complete precipitation.

Simultaneously, iron and other heavy metals are held in solution which can lead to a coloration of the wash and to change to the catalyst in the bleaching.

Unless otherwise indicated, all parts and percentages are by weight.

First, there will be described different examples for the production of alkali aluminum silicates.

EXAMPLE 1

7 kilograms of commercial "moist hydrate", an aluminum oxide hydrate with a water content determined by loss or ignition of 42.5% was dissolved in 50 liters of 12 weight % sodium hydroxide at 100° C. The clear solution was cooled to 80° C. The further treatment took place in a 60 liter glass vessel which was equipped with a stirrer. The power required can be measured by an ammeter. The speed of stirring is regulated continuously. The stirrer was an Ekato-Turbo stirrer according to DIN (German Industrial Standard) 28131 having a diameter of 15 cm. The stirred container had a diameter of 40 cm. and had 4 flow breakers each at an angle of 90°.

The precipitation takes place while there was dosed on through a tube which ended approximately 0.5 cm. above the disc of the turbine stirrer. 8.8 liters of waterglass which contained 26.5 weight % of $SiO_2$ and 8 weight % $Na_2O$.

Before the beginning of the precipitation, there was present in the stirred container 15 liters of aluminate solution. The rest was fed in simultaneously with the waterglass to the reaction mixture. The precipitation was completed after 30 minutes. The precipitated product was x-ray amorphous. In the reaction mixture, the components were present in the mole ratios:

$H_2O:Na_2O = 33$
$SiO_2:Al_2O_3 = 1.3$

At the end of the precipitation, the stirrer required an energy of 0.8 $KW/m^3$. Now the reaction solution was brought to 90° C. with the help of steam. The progress of the crystallization which now began was observed based on the calcium binding capacity. By calcium binding capacity is meant the ion-exchange capability of 1 gram of product which had been dried for 2 hours at 200° C. For the determination, this amount was added to 1 liter of water which contained $CaCl_2$ corresponding to 300 mg. of CaO. Then it was filtered and the amount of CaO remaining in the water titrated complexometrically. The difference from the original 300 mg. gives the binding capacity of the zeolite. The crystallization is complete when the Ca binding capacity no longer changes. After 80 minutes of reaction time, there is attained the value 16.4 and then remains constant.

After the resulting crystallization, the temperature was raised to 95° C. and the product allowed to temper under shear for 30 minutes more. The crystalline product obtained was then washed to pH 10.0 and then dried in the drying cabinet at 200° C. It had the x-ray diagram of Zeolite A as set forth in Milton, German Pat. No. 1,038,017 and Milton, U.S. Pat. No. 2,882,243.

EXAMPLE 2

5.5 kg of the "moist hydrate" with a water content of 42.5% as described in Example 1 was dissolved in 50 liters of 10 weight % sodium hydroxide. The reaction vessel described in Example 1 was equipped with a propeller stirrer having a diameter of 15 cm. according to DIN 28131. During the precipitation and crystallization, the energy requirement of the stirrer was 0.3 $KW/m^3$. As in Example 1, there was present at this point 15 liters of aluminate solution in order to guarantee at the beginning of the waterglass addition sufficient effectiveness for the stirrer. The remainder of the aluminate solution was fed in during 30 minutes. Simultaneously, there dosed directly on the propeller 6.8 liters of waterglass containing 26.5% $SiO_2$ and 8% $Na_2O$. The thus obtained synthesis mixture having a mole ratio of:

$SiO_2:Al_2O_3 = 1.3:1$
$H_2O:Na_2O = 39:1$ was then crystallized at 93° C. After 90 minutes, there is reached a calcium binding power of 168 mg. CaO/g and the reaction was complete. Now the propeller was exchanged for a turbo stirrer as described in Example 1 and tempered with an energy introduction of 0.8 $KW/M_3$ at the same temperature, namely, 93° C. under the influence of shearing energy. After 1 hour, the reaction was broken off, the product washed to a pH of 10 and then spray dried. There was obtained in x-raygraphically pure zeolite of type A.

EXAMPLE 3

In a manner analogous to Example 2, there was prepared a synthesis mixture which contained the components $SiO_2$ and $Al_2O_3$ in the ratio 1:3:1 and water and sodium oxide in the ratio 39:1. After the end of the precipitation step, there was employed a turbo stirrer having a diameter of 10 cm. for shearing during crystallization. The energy requirement amounted to 0.6 $KW/m^3$, the crystallization temperature 90° C. After 110 minutes, the calcium binding capacity of the crystallized zeolite reached an end value of 161 mg CaO/g. Then the stirrer was exchanged for a 3-step MIG stirrer of the firm Ekato and the synthesis mixture tempered with an energy requirement of 0.1 $KW/m^3$ for 4 hours at 92° C. with stirring (without shearing). The product obtained is x-ray graphically pure Zeolite A.

EXAMPLE 4

5.5 kilograms of the commercial wet hydrate described in Example 1 was dissolved in 50 liters of 11 weight % aqueous sodium hydroxide. The aluminate solution obtained was pumped through a Static Mixer ® into a 60 liter reaction vessel. Before the mixture aggregated, there were fed in 8.2 liters of the same waterglass as in Example 1. After the mixing process, a water clear mixture ran into the reaction vessel. The solution was sucked off at the bottom of the reaction vessel and recycled by pumping with 40 h through a rotary pump. The pump had an energy requirement of 1.8 $KW/m^3$. The synthesis mixture which contained a ratio of $SiO_2:Al_2O_3$ of 1.6:1 and $H_2O:Na_2O = 37.1$ was brought to 95° C. After 50 minutes, the crystallization was concluded. Then the temperature was raised to 105° C. and the product tempered for 30 minutes with continued shearing. The product obtained was pure Zeolite A.

EXAMPLE 5

4.5 kilograms of the commercial "moist hydrate" with a water content of 42.5% as described in Example 1 were dissolved in 50 liters of 8 weight % hydroxide in water. Then the solution was intimately mixed with 4.3 liters of waterglass in the manner described in Example 1. Hereupon, the crystallization was carried out at 92° C. under the effect of shearing forces in the way described in Example 1 whereupon the energy requirement was 1 $KW/m^3$.

After the end of the crystallization, the tempering was carried out with the same shear energy and a temperature of 94° C. for 30 minutes. The alkali aluminum silicate obtained was shown by x-ray analysis to be pure Zeolite A.

EXAMPLE 6

Zeolite of Type X

This zeolithic molecular sieve was produced by known process. Such processes are described in Donald W. Breck, Zeolite Molecular Sieves — Structure, Chemistry and Use, John Wiley and Sons, New York (1974), Chapter 4, pp. 245 - 378. The Zeolite Type X had the following mole ratios:

$Na_2O:SiO_2 = 2.01$; $SiO_2:Al_2O_3 = 2.99$;
$H_2O:Na_2O = 41.1$

EXAMPLE 7

Zeolite of Type Y

This zeolithic molecular sieve was produced by known process. Such processes are also described in Breck, Zeolite Molecular Sieves, (1974), Chapter 4, pp. 245 - 378. The Zeolite Type Y had the following mole ratios:

$Na_2O:SiO_2 = 0.398$; $SiO_2O_3 = 5.7$;
$H_2O:Na_2O = 30.0$

The process of production of the crystalline alkali aluminum silicates with hydrophilic surfaces according to the invention as well as their uses is explained in more detail in connection with the following examples.

EXAMPLE 8

(According to the State of the Art)

1 gram of dried alkali aluminum silicate produced according to each of Examples 1 to 5 was ground in a mortar and passed through a sieve having a mesh aperture of 100μ to the surface of a beaker filled with 600 ml of water. The time in which the alkali aluminum silicate was completely wetted by water was measured and used as a measure for the magnitude and hydrophilicity.

The untreated alkali aluminum silicate was still not completely wetted after 10 minutes.

EXAMPLE 9

(According to the Invention)

3.5 kilograms of dried alkali aluminum silicate obtained according to each of Examples 1 to 5 were mixed with 3 liters of an 18% aqueous disodium hydrogen phosphate ($Na_2HPO_4$) solution on a granulating plate whereupon there was formed on about 0.5 mm. diameter granulate. After the drying, the granulate was ground and the hydrophilicity determined according to the method given in Example 8.

The product treated according to the invention is completely wetted after 120 seconds.

EXAMPLE 10

(According to the Invention)

1 kg of the washed, water containing filter cake from the alkali aluminum silicate produced according to each of Examples 1 to 5 which contained 47.5 weight % of dry material was intimately mixed in a Lodige mixer with 33.4 grams of 85% ortho phosphoric acid $H_3PO_4$. After drying the product was ground and the hydrophilicity determined according to Example 8. The wetting time was 240 seconds.

Similar results were obtained with zeolites of Types X and Y when these were treated according to the procedure of Examples 9 and 10.

EXAMPLE 11

(According to the Invention)

7 kg of the unwashed, water containing filter cake of the alkali aluminum silicate (Zeolite Type A) produced according to each of Examples 1 to 5 which contained 47.5 weight % of dry material were adjusted in a Lodige mixer with 800 grams of tartaric acid to a pH value of 9.

After the drying, the product was ground and the hydrophilicity determined according to the method given in Example 8. The product treated according to the invention was completely wetted after 20 seconds.

EXAMPLE 12

(According to the Invention)

7 kg of the filter cake of alkali aluminum silicate (Zeolite Type A) washed with wash water and produced according to each of Examples 1 to 5 and which contained 47.0 weight % of dry material was intimately mixed in a Lodige mixer with 1 kg of sodium tartrate. After the drying, the product was ground and the hydrophilicity determined according to the method set forth in Example 8.

The alkali aluminum silicate modified according to the invention was completely wetted after 16 seconds.

Similar results were obtained with zeolites of Types X and Y when these were treated according to the procedure of Examples 11 and 12.

EXAMPLE 13

(According to the Invention)

There were mixed on a granulating plate (PIV continuous of the company PIV Reimer KG, Bad Homburg) 3.5 kg of an alkali aluminum silicate obtained according to each of Examples 1 to 5 with 3 liters of a 15% aqueous solution of pentasodium triphosphate whereby a granulate was formed with a diameter of about 0.5 mm. After the drying the granulate was ground and the hydrophilicity determined according to the method set forth in Example 8.

The product treated according to the invention was completely wetted after 110 seconds.

Similar results were obtained with zeolites of Types X and Y when these were treated according to Example 13.

EXAMPLE 14

(According to the Invention)

7 kg of the washed, water containing filter cake of the alkali aluminum silicate produced according to each of Examples 1 to 5 and containing 47.5 weight % of dry material were mixed in a Lodige mixer with 70 gram of pentaerythritol.

After drying the product was ground and the hydrophilicity determined according to the method set forth in Example 8.

The product treated according to the invention was completely wetted after 50 seconds.

Similar results were obtained with zeolites of Types X and Y when these were treated according to Example 14.

In the following examples, there are described washing agent compositions in which alkali aluminum silicates having hydrophilic surfaces and produced according to the invention were used as the framework on basic material.

EXAMPLE 15

(According to the Invention)

Perborate containing washing agent

| | |
|---|---|
| Sodium aluminum silicate according to Example 9 | 45.0 weight % |
| Sodium perborate | 2.0 weight % |
| Washing agent powder | 35.0 weight % |

The washing agent powder was produced, for example, by hot drying the following compositions:

| | |
|---|---|
| ABS (sodium dodecylbenzene sulfonate) | 21.0% |
| Ethoxylated tallow alcohol (1 mole tallow alcohol + 14 moles ethylene oxide) | 7.5% |
| Soap (sodium salt of saturated essentially $C_{18}$–$C_{22}$ fatty acids) | 7.2% |
| Waterglass ($Na_2O \cdot 3.3SiO_2$) | 9.0% |
| Magnesium sulfate | 4.5% |
| Carboxymethyl cellulose | 2.0% |
| Optical brightener | 0.6% |
| Soluble complex (e.g., sodium citrate, or nitrilotriacetic acid (NTA), or ethylene diamine tetraacetic acid (EDTA), or sodium triphosphate, or POC, etc.) | 9.0% |
| Sodium sulfate | 35.0% |
| Water | Balance |

The washing agent was produced by mixing the three constituents in powder form.

EXAMPLE 16

(According to the Invention)

Perborate Free Washing Agent

| | |
|---|---|
| Ethoxylated $C_{11}$–$C_{15}$ oxoalcohol (1 mole oxoalcohol + 3 moles ethylene oxide) | *2.0% |
| Ethoxylated $C_{11}$–$C_{15}$ oxoalcohol (1 mole oxoalcohol + 13 moles ethylene oxide) | **5.0% |

*This ingredient can be replaced by the same amount of tallow alcohol + 5 moles of ethylene oxide.
**This ingredient can be replaced by the same amount of tallow alcohol + 14 moles of ethylene oxide.

| | |
|---|---|
| Sodium aluminum silicate prepared according to Example 10 | 40.0% |
| Soda (sodium carbonate) | 15.0% |
| Sodium citrate | 5.0% |
| Waterglass ($Na_2O \cdot 3.3SiO_2$) | 4.0% |
| Carboxymethyl cellulose | 1.2% |
| Optical brightener | 0.2% |
| Sodium sulfate | 23.0% |
| Water | Balance |

The washing agent was produced by spraying the ethoxylation product (nonionic surfactant) on the powder particles consisting of the remaining constituents.

EXAMPLE 17

(According to the Invention)

Perborate Containing Washing Agent

This example is exactly like Example 15 except there is employed the hydrophilic sodium aluminum silicate of Example 11 in place of the hydrophilic sodium aluminum silicate of Example 9.

EXAMPLE 18

(According to the Invention)

Perborate Free Washing Agent

This example is exactly like Example 16 except that there is employed the hydrophilic sodium aluminum silicate of Example 12 in place of the hydrophilic sodium aluminum silicate of Example 10.

EXAMPLE 19

(According to the Invention)

Perborate Containing Washing Agent

This example is exactly like Example 15 except that there is employed the hydrophilic sodium aluminum silicate of Example 14 in place of the hydrophilic sodium aluminum silicate of Example 9.

EXAMPLE 20

(According to the Invention)

Perborate Free Washing Agent

This example is exactly like Example 16 except that there is employed the hydrophilic sodium aluminum silicate of Example 14 in place of the hydrophilic sodium aluminum silicate of Example 10.

While in Examples 15, 16, 17, 18, 19 and 20, there was used a Type A sodium aluminum silicate, this can be replaced by the hydrophilic Type X and Type Y alkali metal aluminum silicates mentioned in Examples 10, 11, 12, 13 and 14.

Except for using the hydrophilic alkali aluminum silicate molecular sieve, the washing agents are the same as those conventionally employed in the art. Thus, there can be used the conventional detergents, e.g., anionic, cationic and nonionic detergents. Thus, as detergents there can be used, for example, higher alkyl sulfate detergents, particularly the alkali metal salts of such sulfates, those having 8 to 22 carbon atoms in the alkyl residue such as sodium lauryl sulfate, potassium lauryl sulfate, sodium octadecyl sulfate, sodium coconut fatty alcohol sulfate, sodium octanyl sulfate, sodium alkyl ($C_{14}$–$C_{18}$) sulfate, as well as the corresponding long chain aliphatic sulfonates, e.g., sodium octanyl sulfonate, sodium dodecyl sulfonate, sodium tetradecyl sulfonate, sodium octadecyl sulfonate, potassium dodecyl sulfonate, ammonium dodecyl sulfonate, sodium decyl sulfonate, higher alkyl ether sulfates soap, higher alkyl glyceryl ether sulfonates, higher alkyl phenol polyethylene oxide sulfates, polyoxyethyl ethers of fatty alcohols, polyethylene oxide condensates with higher alkyl phenols such as isooctyl and nonyl phenol condensed with 3 to 20 moles of ethylene oxide, sodium o-xylene sulfonate, potassium xylene sulfonate, potassium tertiary octylbenzene sulfonate, potassium dodecyl toluene sulfonate, sodium p-xylene sulfonate, sodium propyl naphthalene sulfonate, sodium butyl naphthalene sulfonate, lauramidodipropyl dimethyl benzyl ammonium chloride and N-diethylamino oleylamide hydrochloride.

There can also be present conventional additives including bleaching agents; e.g., sodium perborate, water softeners, e.g., borax, as well as other additives including sodium carbonate, sodium sulfate and potassium carbonate, as well as polyvinyl alcohol, carboxymethyl cellulose, etc.

The other materials can be omitted if desired.

The compositions can comprise, consist essentially of, or consist of the materials set forth and the process can comprise, consist essentially of or consist of the steps set forth.

POC is an abbreviation for poly (hydroxylatdehydocarboxylates) as set forth in Haschke et al, U.S. Pat. No. 3,923,742.

What is claimed is:

1. In a washing, rinsing or cleansing agent containing an alkali aluminum silicate and a detergent, the improvement comprising employing as said silicate the hydrophilic alkali aluminum silicate prepared by the process comprising mixing a crystalline ion exchanging alkali metal aluminum silicate with a hydrophilic material which is ortho phosphoric acid, an alkali metal ortho phosphate, pentasodium tripolyphosphate, tartaric acid, an alkali metal tartrate or pentaerythritol in the presence of water, said hydrophilic material being employed in an amount sufficient to impart hydrophilicity to the alkali metal aluminum silicate but not over 30% of the weight of the silicate, drying and subsequently grinding the treated silicate to a particle size of not over 100 microns.

2. A washing, rinsing or cleansing agent according to claim 1 wherein the hydrophilic material is an ortho phosphoric acid or an alkali metal ortho phosphate.

3. A washing, rinsing or cleansing agent according to claim 1 wherein the hydrophilic material is pentasodium tripolyphosphate.

4. A washing, rinsing or cleansing agent according to claim 1 wherein the hydrophilic material is tartaric acid or an alkali metal tartrate.

5. A washing, rinsing or cleansing agent according to claim 1 wherein the hydrophilic material is pentaerythritol.

6. In a washing, rinsing or cleansing agent, containing an alkali aluminum silicate and a detergent, the improvement comprising employing as said silicate the hydrophilic alkali aluminum silicate prepared by the process consisting of mixing a crystalline ion exchanging alkali metal aluminum silicate with a hydrophilic material which is ortho phosphoric acid, an alkali metal ortho phosphate, pentasodium tripolyphosphate, tartaric acid, an alkali metal tartrate or pentaerythritol in the presence of water, said hydrophilic material being employed in an amount sufficient to impart hydrophilicity to the alkali metal aluminum silicate but not over 30% of the weight of the silicate, drying and subsequently grinding the treated silicate to a particle size of not over 100 microns.

7. A washing, rinsing or cleansing agent according to claim 6 wherein the hydrophilic material is an ortho phosphoric acid or an alkali metal ortho phosphate.

8. A washing, rinsing or cleansing agent according to claim 6 wherein the hydrophilic material is pentasodium tripolyphosphate.

9. A washing, rinsing or cleansing agent according to claim 6 wherein the hydrophilic material is tartaric acid or an alkali metal tartrate.

10. A washing, rinsing or cleansing agent according to claim 6 wherein the hydrophilic material is pentaerythritol.

* * * * *